United States Patent [19]
Kliman

[11] Patent Number: 6,025,666
[45] Date of Patent: Feb. 15, 2000

[54] CONTROLLABLE FLUX PERMANENT MAGNET MOTOR

[75] Inventor: Gerald Burt Kliman, Niskayuna, N.Y.

[73] Assignee: General Electric Company, Schenectady, N.Y.

[21] Appl. No.: 09/102,185

[22] Filed: Jun. 22, 1998

[51] Int. Cl.⁷ ..................................................... H02K 21/12
[52] U.S. Cl. ........................ 310/156; 310/154; 310/261; 310/49 R
[58] Field of Search ..................................... 310/156, 154, 310/261, 49 R

[56] References Cited

U.S. PATENT DOCUMENTS

| | | | |
|---|---|---|---|
| 4,562,399 | 12/1985 | Fisher | 322/94 |
| 4,712,028 | 12/1987 | Horber | 310/49 R |
| 5,548,172 | 8/1996 | Kliman et al. | |

*Primary Examiner*—Nestor Ramirez
*Assistant Examiner*—Thanh Lam
*Attorney, Agent, or Firm*—Marvin Snyder; Douglas E. Stoner

[57] ABSTRACT

A permanent magnet motor employing sets of divided magnets on the surface of the rotor enables stator current to be used to control the net flux in the stator teeth, yoke and airgap. Each set of divided magnets circumscribes a respective portion of an arc of 360° about the center of the rotor and is made up of a subset of a number of successive south (S) magnet polarities and a subset of an of successive north (N) magnet polarities arranged such that each subset about the 360° arc is of opposite polarity to the adjacent subset at either side. This enables terminal voltage to be kept constant as speed increases, but with less current than in the case of conventional surface magnet motors.

9 Claims, 5 Drawing Sheets

CONTROLLABLE FLUX PERMANENT MAGNET MOTOR

FIELD OF THE INVENTION

This invention relates generally to the field of permanent magnet brushless DC (direct current) motors, and more specifically, to magnet configurations that enhance control over the net flux through the stator.

BACKGROUND OF THE INVENTION

In conventional brushless DC motors the net flux is essentially dictated by the permanent magnets. The flux may be controlled to some extent by very large stator currents. This, however, is expensive in inverter rating and in energy.

It would be desirable to achieve a permanent magnet motor in which the flux may be controlled in a manner similar to that of an induction motor while retaining most of the desirable characteristics of the surface magnet (brushless DC) motor.

SUMMARY OF THE INVENTION

A permanent magnet motor comprises a controllable flux rotor, including a magnetic core, with a plurality of sets of divided magnets circumferentially situated about the rotor. Each set of divided magnets circumscribes a respective portion of an arc of 360° about the center of the rotor and comprises a first subset of a number of successive south (S) magnet polarities and a second subset of a number of successive north (N) magnet polarities arranged such that each subset about the 360° arc is of opposite polarity to the adjacent subset at either side. A stator encircles the rotor and includes a plurality of teeth. The stator current controls the net flux in the stator teeth, so that terminal voltage can be kept constant with increasing speed, at lower current than possible for conventional surface magnet motors of similar output ratings.

DETAILED DESCRIPTION OF THE INVENTION

Figure 1:
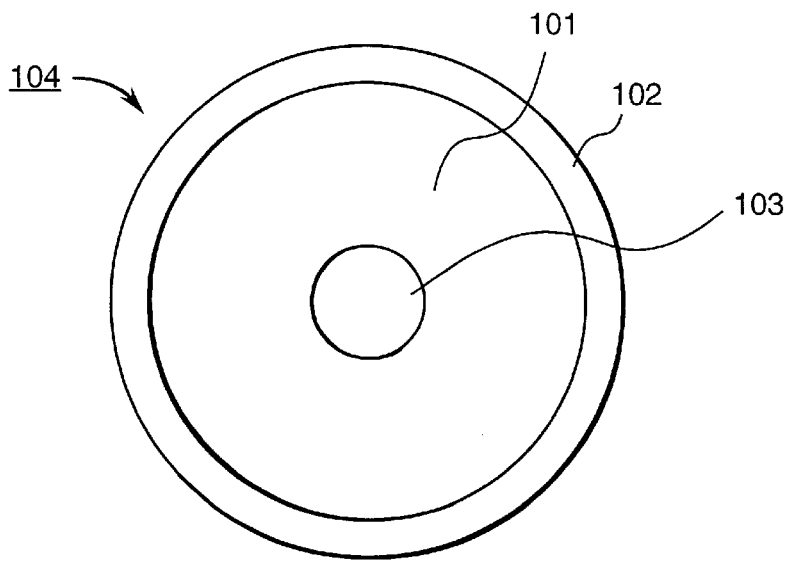
FIG. 1 is a plan view of a typical (prior art) permanent magnet rotor for a brushless DC (BDC) motor.

FIG. 1 shows the rotor configuration of a (prior art) conventional brushless DC (BDC) motor, also known as an electronically commutated motor (ECM). Rotor 104 is comprised of a solid or laminated magnetic steel core 101 on which a ring magnet 102 has been mounted by gluing or other well known methods. Often, the ring magnet 102 will comprise a set of, for example, three 120° magnet arcs, which helps to reduce manufacturing costs and increase the magnet energy. Also illustrated is a shaft 103 on which core 101 is mounted. The motor efficiency, due to the magnets, is quite high. However the flux is largely dictated by magnet 102 and is not normally much influenced by stator current due to the relatively huge effective gap introduced by the magnet body. This results in forcing the control to an approximate volts/Hz operation over the entire speed range.

Figure 2:
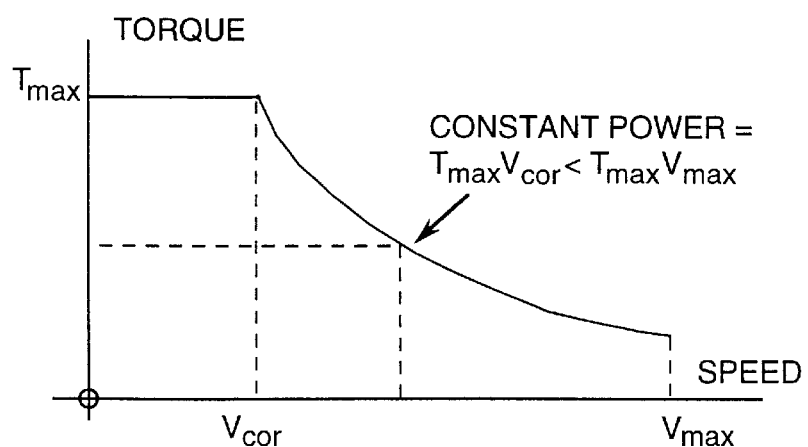
FIGS. 2 and 3 are graphs of the typical torque versus speed characteristic for an adjustable speed drive (ASD) induction motor.
Figure 3:
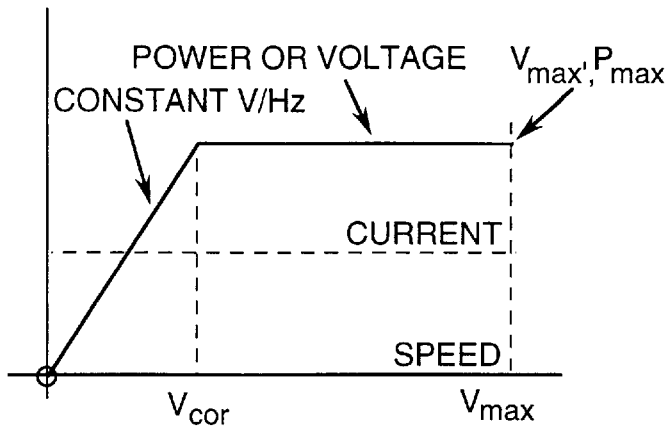

FIGS. 2 and 3 illustrate a typical industrial or motion control torque versus speed profile for an induction motor drive. The profile has a constant torque portion from standstill to the corner speed Vcor. Then, in order to minimize the power electronics size and complexity, the output shaft power is kept constant over the remainder of the speed range from Vcor to Vmax. This characteristic is achieved by maintaining a constant magnitude of AC magnetic flux in the motor and a constant magnitude of the AC current from zero speed to Vcor. Constant magnetic flux magnitude is (approximately) achieved by controlling the applied AC voltage, usually by means of pulse width modulation (PWM), such that the applied AC voltage magnitude increases linearly, proportionally to the speed which is, in turn, approximately proportional to the applied AC frequency. Hence this mode of operation is often referred to as "constant volts/Hz." Above speed Vcor, the constant power region is achieved by holding the voltage magnitude constant as speed and frequency increase. That is, the volts/Hz is allowed to decrease as speed increases, thus reducing the flux magnitude in proportion. The current is approximately at a constant magnitude over the entire speed range.

Figure 4:
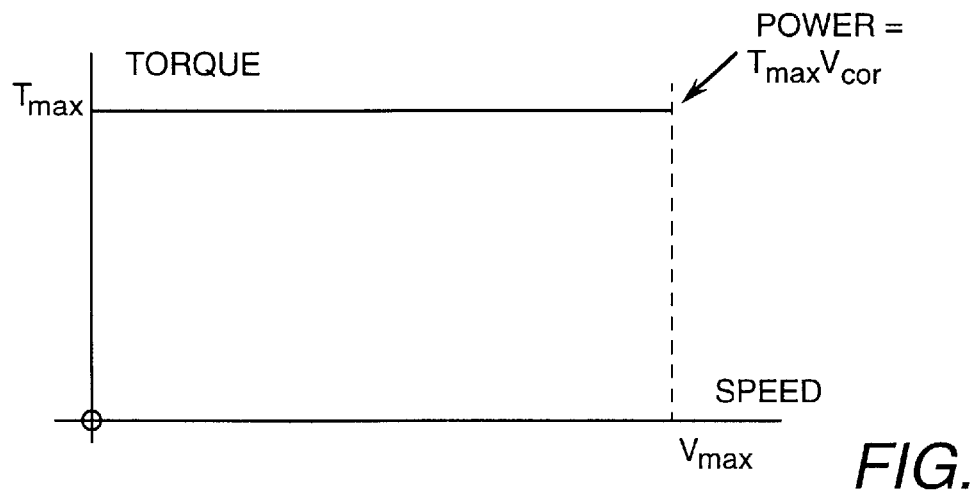
FIGS. 4 and 5 are graphs of a typical torque versus speed characteristic for a typical BDC motor.
Figure 5:
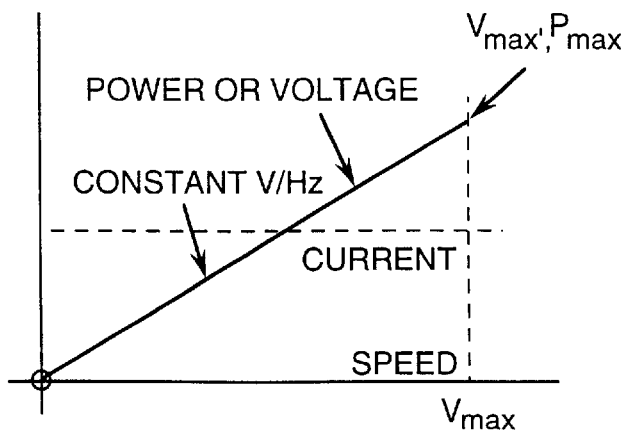

In contrast, FIGS. 4 and 5 show the situation where it is not feasible to vary the magnetic flux magnitude very much. This occurs when using the conventional form of a permanent magnet excited brushless DC (BDC) motor, due to the nature of permanent magnets and the large effective gap they present to fields produced by stator currents. Thus the motor must operate over the entire speed range as if it were in the region from zero to Vcor in FIGS. 2 and 3. Hence, in order to deliver the same starting torque in the same size motor and still achieve the same maximum speed, the voltage must continue to increase rather than leveling off as in FIG. 3. This results in an inverter rating which is higher than it needs to be by the ratio Vmax/Vcor.

Thus the inverter KVA (kilovolt amperes) is fixed by the maximum torque and speed (FIG. 4). But very often, a constant power characteristic (FIG. 3) is desired over part of the speed range. This is the mode of operation most often used in induction motor drives. The constant power region is achieved by flux weakening as speed is increased and is easily accomplished, in induction motors, by fixing the voltage after the corner speed Vcor is reached. This ability to now reduce the flux with increased speed results in the smallest inverter KVA requirement while still achieving required performance.

Figure 6:
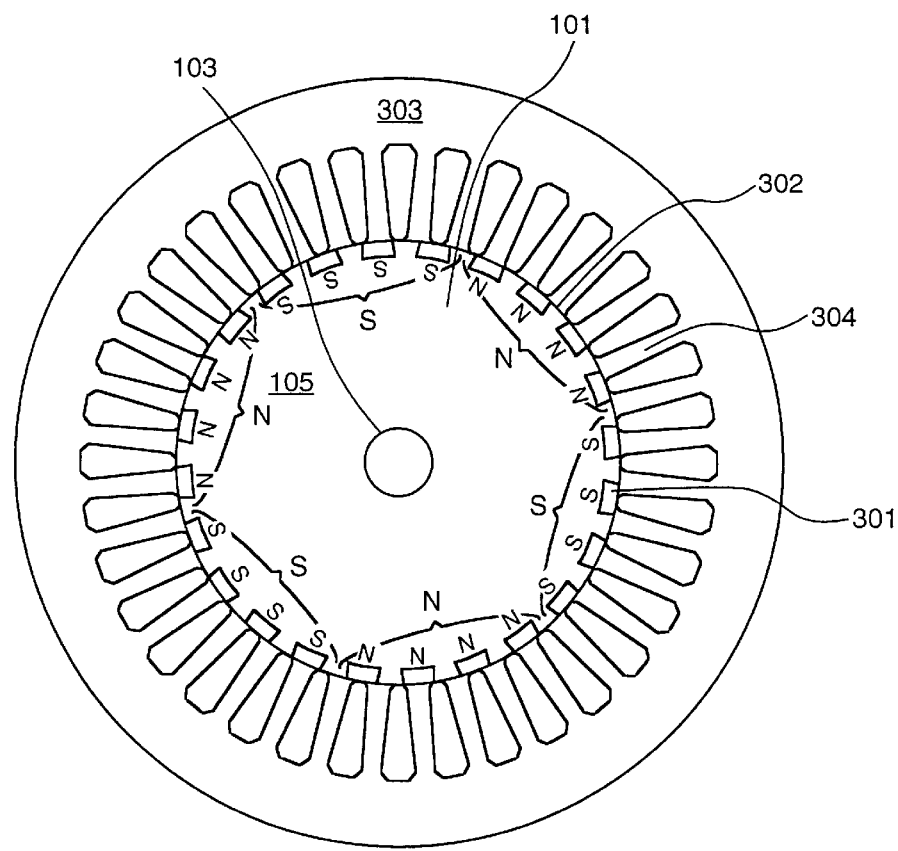
FIG. 6 is a plan view of a controllable flux, divided magnet brushless DC (BDC) motor employing a permanent magnet (PM) rotor using divided magnets, in accordance with the invention.
Figure 7:
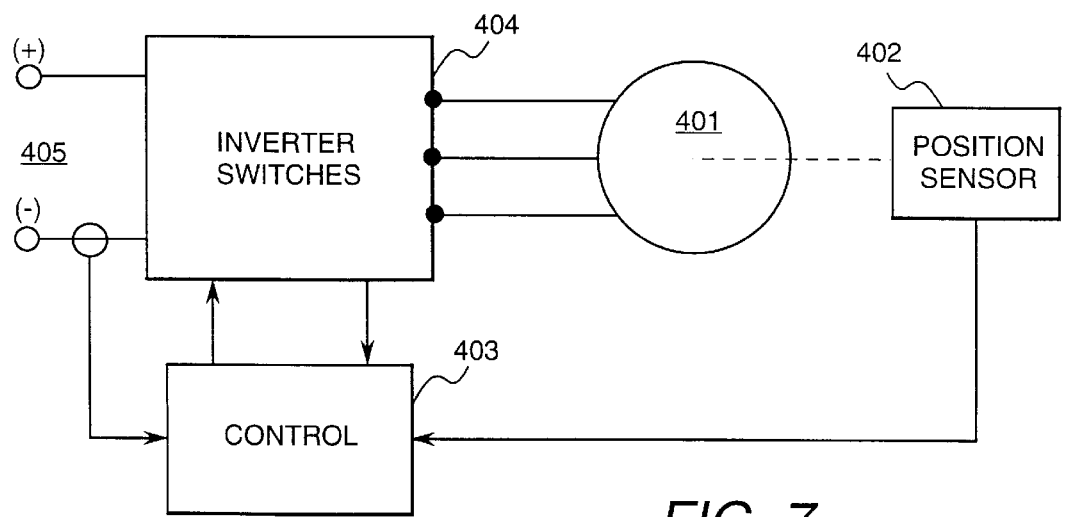
FIG. 7 is a block diagram of an ASD flux-controlled system for a divided magnet BDC PM motor employing a divided magnet rotor, in accordance with the invention.

By using divided magnets 301 in accordance with the invention as shown in FIG. 6, and by operating the resulting motor 401 in an electronic control system such as shown in FIG. 7, net flux in the stator is more easily controlled by stator currents while retaining the benefits of PM excitation.

Commonly-assigned and invented U.S. Pat. No. 5,548,172 discloses a suitable magnetic core configuration for a line start, synchronous, permanent magnet motor, but the motor is a fixed speed motor and the patent does not teach or suggest controlling flux to reduce current rating, or the driving electronics necessary to suitably control flux as well as speed and thus enable a reduced inverter rating.

The embodiment shown in FIG. 6 illustrates three sets of divided magnets 301 imbedded in core 101 of rotor 105, each set comprising a serial subset plurality of a given number of north (N) magnet polarities adjacent a serial subset plurality of an equal number of south (S) magnet polarities, so that each N-S set forms an arc of approximately 120°, while each separate N magnet plurality subset and each separate S magnet plurality subset circumscribes an approximately 60° arc, to yield a net six pole motor. Other pole numbers are equally possible, and are encompassed by this disclosure and its associated claims. Further, it is sometimes desirable not to have the same number of N and S divided magnets. This can result from selecting a non-integral relationship between rotor and stator slotting to reduce losses or noise, for example.

FIG. 7 shows motor 401 proximate a position sensor 402 for sensing angular position of the rotor, and their further interconnections with a control module 403 and inverter switches 404 connected to a DC bus 405.

In motor 401, divided magnets 301 feed magnet flux directly into the airgap much as in the conventional BDC motor. However the stator currents can now cause stator flux to flow in rotor teeth defined by core 101 portions between each pair of successive divided magnets 301. The rotor teeth are close to stator 303 with a small effective airgap 302. The net flux in stator teeth 304, yoke and airgap 302 will then be the sum or difference (i.e., algebraic sum) of the two (magnet and stator) fluxes, depending on the exact control strategy employed. Hence the terminal voltage may be kept constant as speed increases (as in FIG. 3), but with much smaller current than in the case of conventional surface magnets. In this configuration, the magnet flux and the stator (armature reaction) flux generally follow the same sort of path in the stator. The magnet flux goes through the rotor magnets and the stator flux goes through the rotor teeth.

Figure 8:
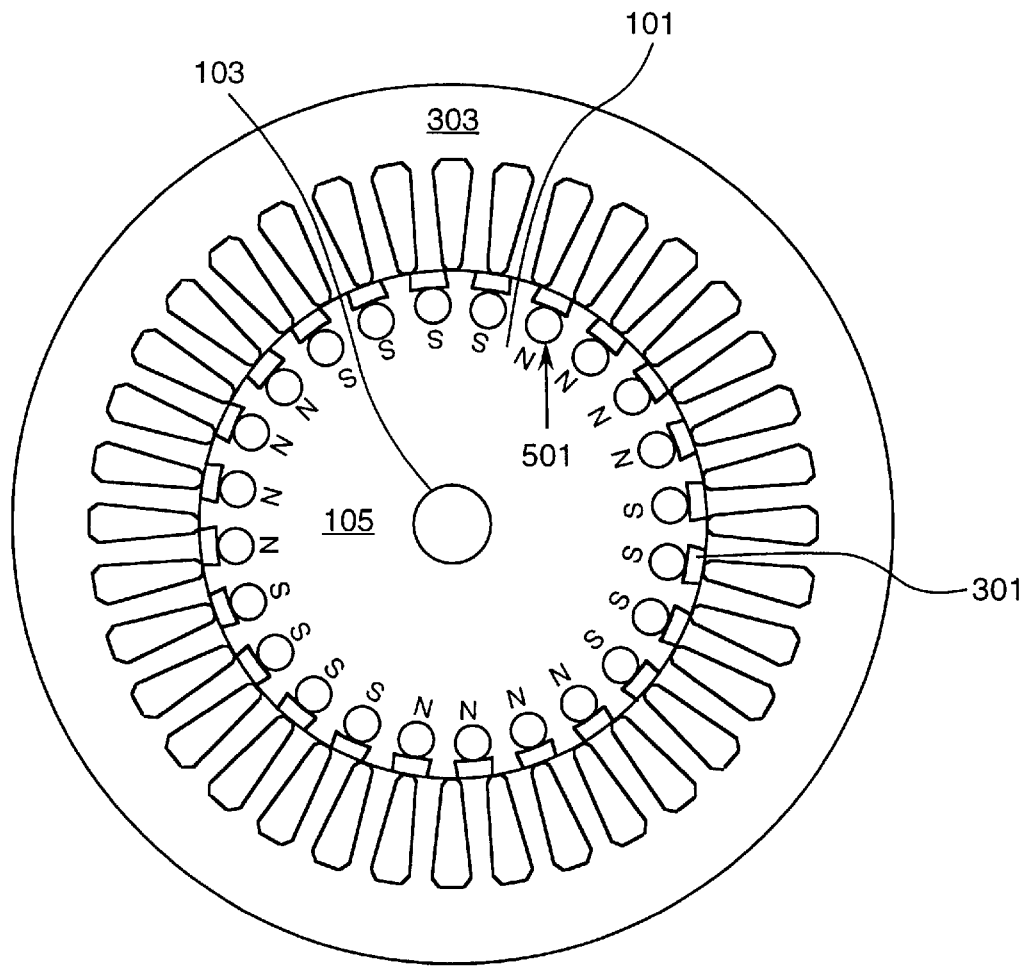
FIG. 8 is a plan view illustrating magnet cages added under the divided magnets in the embodiment of FIG. 6.
Figure 9:
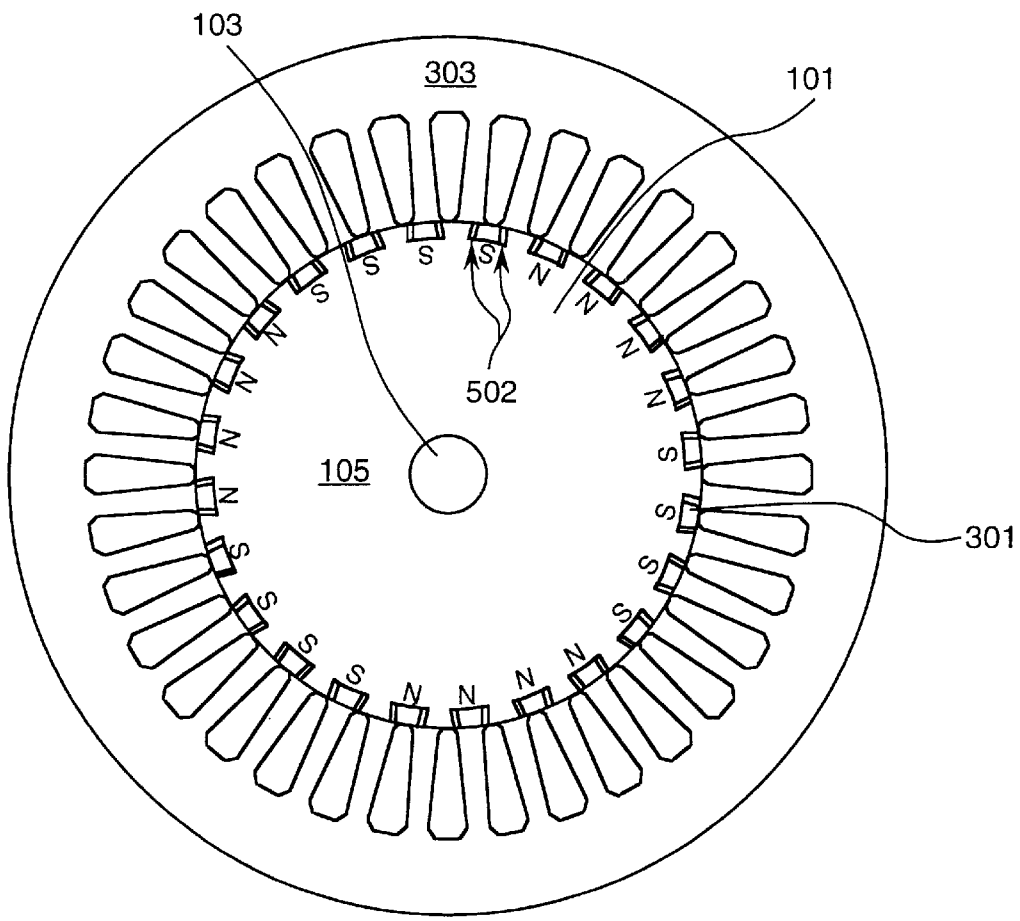
FIG. 9 is a plan view illustrating magnet cages added adjacent to the divided magnets in the embodiment of FIG. 6.

"Squirrel cage" 501 (typically comprised of a plurality of cage bars adjoining a pair of end rings) may be added in core 101 under magnets 301, i.e., between the magnets and shaft 103, as shown in FIG. 8. Alternatively, cage bars 502 may be added next to magnets 301, i.e., circumferentially adjacent the magnets at each side thereof, as shown in FIG. 9. Cages 501, 502 are useful for stabilizing motor 401 (FIG.7) without specific control action in inverter 404.

The invention may be used in motion controls and energy converters in place of brushless DC motors or induction motors to increase efficiency and/or reduce inverter size and complexity.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

What is claimed is:

1. A permanent magnet motor, comprising:
    a controllable flux rotor including a magnetic core;
    a plurality of sets of divided magnets circumferentially situated about said rotor, each said set of divided magnets circumscribing a respective portion of an arc of 360° about the center of said rotor and comprising a first subset of a number of successive south (S) magnet polarities and a second subset of a number of successive north (N) magnet polarities arranged such that each subset about said 360° arc is of opposite polarity to the adjacent subset at either side thereof; and
    a stator encircling said rotor and including a plurality of teeth.

2. The permanent magnet motor of claim 1 wherein said divided magnets are imbedded in said magnetic core.

3. The motor of claim 2, further comprising a plurality of bars equal in number to the plurality of divided magnets, each of said bars being situated radially inward of each of said divided magnets, respectively.

4. The motor of claim 2, further comprising a plurality of cage bar pairs equal in number to the plurality of divided magnets, the bars of each of said cage bar pairs being situated at each side of each of said divided magnets, respectively.

5. The motor of claim 1, wherein:
    the portion of arc of 360° circumscribed by each said set of divided magnets comprises an arc of substantially 360° divided by said plurality of sets;
    each of said divided magnet sets comprises a subset of successive, divided north magnet polarities adjacent a subset of successive, divided south magnet polarities; and
    the divided magnet subset most closely proximate one another are of opposite polarities.

6. The motor of claim 1, further comprising a plurality of bars equal in number to the plurality of divided magnets, each of said bars being situated radially inward of each of said divided magnets, respectively.

7. The motor of claim 1, further comprising a plurality of cage bar pairs equal in number to the plurality of divided magnets, the bars of each of said cage bar pairs being situated at each side of each of said divided magnets, respectively.

8. A control system for the permanent magnet motor of claim 1, comprising:
    a rotor position sensor for sensing angular position of said rotor;
    a control module for receiving rotor angular position information from said rotor position sensor; and
    inverter switches coupled to said control module and the permanent magnet motor for maintaining terminal voltage at a substantially constant level while rotor speed increases.

9. A method for controlling net magnetic flux through a stator surrounding a rotor, said rotor comprising a magnetic core and a plurality of divided magnets circumferentially situated about said rotor, each said set of divided magnets circumscribing a respective portion of an arc of 360° about the center of said rotor and comprising a first subset of a number of successive south (S) magnet polarities and a second subset of a number of successive north (N) magnet polarities arranged such that each subset about said 360° arc is of opposite polarity to the adjacent subset at either side thereof, comprising the steps of:
    feeding a magnet flux from said divided magnets into an airgap between said rotor and said stator; and
    feeding stator flux into rotor teeth proximate said stator and defined by magnetic core portions between each pair of successive divided magnets;
    whereby said net magnetic flux through said stator is an algebraic summation of said magnet flux and said stator flux.

* * * * *